United States Patent Office 2,921,771
Patented Jan. 19, 1960

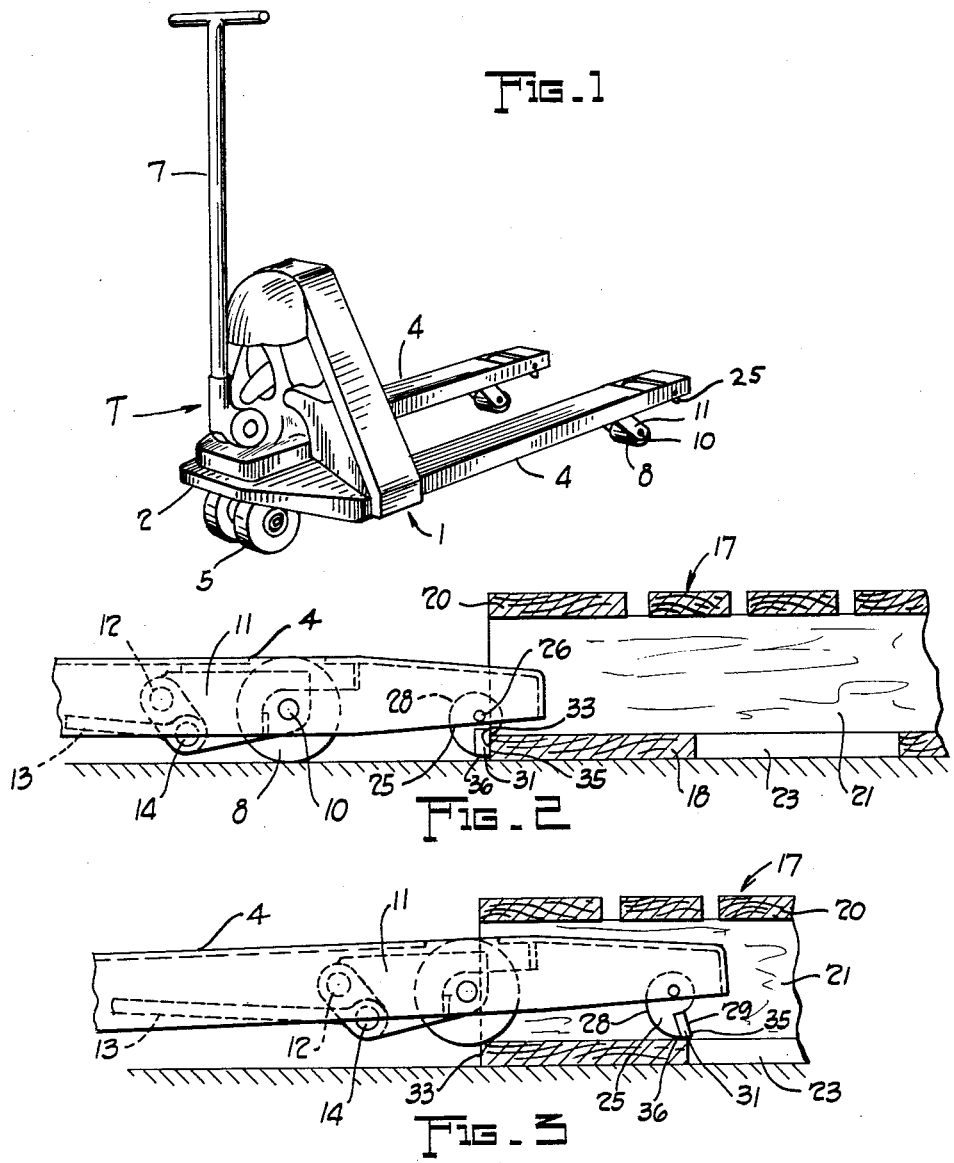

2,921,771
PALLET ENTRY DEVICE

Robert J. Emary, Cochituate, Mass., assignor to The Colson Corporation, Elyria, Ohio, a corporation of Ohio Application September 19, 1957, Serial No. 684,919

11 Claims. (Cl. 254—2)

This invention relates to pallet trucks and more particularly to a pallet entry device for aiding the entry of the load bearing lifting platforms or forks into position between the upper and lower floors of a pallet. My invention improves upon the pallet entry mechanisms of, among others, the mechanisms disclosed in the Quayle Patents Nos. 2,274,164, 2,498,504 and 2,615,677 which teach the general objects and purposes of such mechanisms and the need for improving upon the same.

It is therefore a general object of my invention to provide an improved, efficient, foolproof pallet entry device for materials handling equipment or pallet trucks which have a wheeled load supporting platform or fork. Similarly it is among the objects of my invention to solve the problems stated in the prior patents but left unsolved by the teachings thereof.

It is a further object of my invention to provide a pallet entry device, for materials handling equipment having a wheeled load supporting platform or fork which has a resistance to entry into the pallet as the platform advances into the pallet, which operates smoothly and easily to raise the entering end of the platform or fork and facilitate the easy entry of the load bearing wheels.

Other objects of my invention are the provision of a pallet entry device which provides a continuous rolling contact with the bottom boards of the pallet as the load platforms or fork advances thereover; which smoothly raises the adjacent traction wheels onto and into the pallet; which operates easily; which is initially actuated by engagement against the vertical edge of the bottom boards; which requires a minimum of force to effect entry into the pallet; which materially reduces the tendency of the materials handling equipment to cause the pallet to slide across the traction surface; and which is adapted to function to smoothly lower the load platform when the load bearing or traction wheels are withdrawn from the pallet.

These and other objects and advantages of my invention will become apparent from the following description of a preferred form thereof, reference being had to the drawings in which:

Figure 1 is a perspective view, in outline, of a typical materials handling truck, with the load carrying forks or platform raised, in which my invention is employed.

Figure 2 is an enlarged side elevation of the rearward end of the truck of Figure 1 and a section of a pallet, showing a preferred embodiment of my invention upon initial engagement with the floor board of the bottom of the pallet.

Figure 3 is a view similar to Figure 2 showing the rearward end of the truck after the forks and the rear wheels thereof have been lifted onto the bottom floor boards and into the pallet by the pallet entry device embodying my invention.

Pallet entry devices embodying my invention may be used with trucks which have either bifurcated or solid platforms, which are manually powered or motor driven and which are guided by an ambulatory operator or by one who is carried by the truck. Such trucks usually have steering wheels at their forward end and transversely spaced, lifting wheels or pairs of wheels at the rearward end of the load carrying forks or platform. For convenience I shall describe my invention in the environment of a hand operated pallet truck.

As shown in Figure 1 such a truck T conveniently comprises a frame 1 having a rounded forward portion 2 and low, flat, longitudinally rearwardly extending, transversely spaced, load carrying parts 4, variously called forks or platforms in the usage of the art. The forward end 2 of the frame is supported by one or more swivelling or steering wheels 5 and carries a power mechanism, which in the instant case, is a handle 7 and conventional linkage, not shown, for raising and lowering the rear wheels 8. The handle is also used to guide the truck. Each of the forks 4 of the truck is provided with one or more rear wheels 8, which are mounted on axles 10 carried by arms 11, which in turn are rotatably supported on the frame 1 by shafts 12 (see Figures 2 and 3). Suitable linkages indicated generally at 13 are pivotally mounted on arms 11, as at 14, and extend toward the forward end of the truck and connect with the power mechanism and handle at the forward end of the truck by which the arms 11 may be rotated about the respective shafts 12 from approximately horizontal to approximately vertical positions, cf. Figures 2 and 1. This movement raises or lifts the load platform from the floor or traction surface, Figure 1, and reverse motion lowers the rear end of the truck, "trucking" the wheels 8 up into the forks to facilitate entry into the pallet, Figures 2 and 3. When the forks have entered a pallet to full load-bearing location, the wheels 8 can be brought to contact with the traction surface through transverse spaces 23 suitably located between the bottom floor boards of the pallet. Thereafter further lowering of the wheels 8 lifts the pallet and the load thereon and the truck and load become ambulatory.

As shown in Figure 2, a conventional pallet indicated generally at 17, Figures 2 and 3, usually comprises a bottom 18 and a top 20 which are supported in vertically spaced relation by and in turn supported a plurality of transversely spaced longitudinally extending elements such as 2 x 4's 21. The bottom floor 18 of the pallet is provided with transversely extending voids or spaces 23 so as to provide means by which the rear wheels 8 of the truck may have access through the pallet bottom to the traction surface. The top 20 of the pallet may be substantially solid as shown or, if "reversibility" is sought, similar to the bottom 18.

Trucks and pallets of the kind and to the extent described above are well-known in the art and require also means to aid the entry of the forks into the pallet. Heretofore, difficulty has been experienced in moving the forks or platforms into and between the top and bottom floors of pallets such as 17 because the height of the floor boards of the bottom 18 of the pallet is relatively great compared to the diameter of the rear wheels 8 and the wheels therefore do not readily climb over the edge or edges of the bottom boards.

In order to aid the movement of the platforms and forks into the pallet it is necessary that the rearward ends thereof be lifted relative to the floor boards other than by lowering the wheels 8 from their raised position of Figures 2 and 3. My invention insures a positive, smooth, frictionless, gradual lifting of the rearward portions of the truck with a continuous rolling engagement between my lifting device and the floor and/or spaced floor boards of the bottom of the pallet.

To this end I provide a rotary cam 25 rearwardly of each of the rear wheels 8 in each of the forks of the truck so as to provide stability to the truck and to lift both the forks or platforms evenly. The cams 25 are each rotatably supported on axles 26 near the rearmost ends of the forks. Each cam 25 has a curved external bearing surface 28 preferably in the form of an Archimedean spiral, the short and long radius ends of which are interconnected by a flat rearwardly facing surface 29 which is preferably parallel to and offset from a true radial plane. Preferably the cam is weighted as at 31 adjacent, forwardly of as viewed in Figures 2 and 3, the surface 29 so that when the same is freely suspended the surface 29 hangs substantially vertically and thus perpendicular to the forks and the traction surface, and, therefore, parallel with the forward vertical edge face 33 of the bottom of the pallet. The chordal length of the surface 29 is preferably substantially or about equal to the height of the bottom boards of the pallet and is such that the lower edge 35 of the cam, i.e., the intersection of surface 29 and the surface 28 of maximum radius is slightly spaced above the traction surface when the wheels 8 are in their raised, pallet-entering, position, and the cam is freely suspended from the axle 26 as shown in Figure 2.

The cams 25 are longitudinally spaced rearwardly from the rearward portion of the rear wheels by an amount substantially or about equal to the peripheral length of the spiral surface 28 of the cam. As the forks of the truck are backed into the pallet, Figure 2, each cam 28 hangs with its surface 29 facing rearwardly and perpendicular to the traction surface. As the rearward end of the fork projects into the pallet, the surface 29 is brought into engagement with the edge 33 of the floor 18, Figure 2. Continued rearward movement of the truck causes the cams to be rotated about their axes 26, clockwise as viewed, until the cams are turned through a small angle, if any, sufficient to bring the small radius and rearwardly disposed portion of the surface 28 into frictional engagement with the upper surface of the floor of the bottom of the pallet. Once this engagement is established, continued rearward movement of the truck causes the spiral surface 28 to roll along the upper surface of the bottom of the pallet, lifting the axles 26 and the forks and the rear of the truck with each increment of angular turning of the cams. By the time a large radius portion 36 of surface 28 is brought to contact with the floor of the pallet, the truck will have been raised by an amount substantially equal to the height of the edge 33, i.e., the thickness of the floor of the pallet, and the truck will have advanced rearwardly substantially to a position where the rear wheels 8 first engage the floor of the pallet at the top of the edge 33, see Figure 3. The initial contact between the rear wheels 8 and the pallet is effected, because of the lifting action of my invention, at or near the lowermost portions of the wheels, i.e., the part of the wheel which is so substantially beneath the axle 10 that there is little or no noticeable or deleterious impediment to the rear wheels rolling over the edge 33 and easily onto the top surface of the bottom of the pallet.

Between the positions shown in Figures 2 and 3, the cams will have rotated a little less than 360°, and as suggested in Figure 3, further rotation of the cams and the resultant lifting of the forks will coincide with and accommodate the rolling of the wheels 8 up over the upper corners of the edges 33. Similarly but oppositely, Figure 3 may suggest the withdrawal of the forks from the pallet; the truck parts moving leftwardly, as viewed, the wheels 8 rolling over the edges 33 and the cams, first having had a sliding contact with the floor in the position about as shown, beginning to bear the load of the fork and thereafter being rotated counterclockwise to approximately the position shown in Figure 2 having smoothly lowered the forks and brought the wheels 8 into rolling contact with the traction surface on which the pallet rests and over which the truck rolls.

The weight 31 contributes to the nicety of gravity-induced position of the cam although it is obvious that the large lobe of a spiral cam would tend to hang below the axle about which it is free to rotate. The external spiral surface of each of the cams 25 preferably has or is treated to have a relatively high frictional value in relation to the floor boards comprising the bottom of the pallet wherewith to induce the desired rotation of the cams as described above to provide the desired lifting and/or lowering action or actions. Correspondingly a low frictional relation between the cams 25 and their axles 26 is also desired.

Modifications, changes and improvements to the preferred embodiment of my invention herein specifically illustrated and described may occur to those skilled in the art who come to understand the precepts and principles of my invention. Therefore, I do not wish to be limited in the scope of my patent to the preferred form of my invention nor in a manner inconsistent with the advance by which my invention has promoted the art.

I claim:

1. In a materials handling truck having a load carrying platform with transversely spaced rear wheels for transporting pallets and the like, which have bottoms adapted to rest on a traction surface, the improvement of a pallet entry device comprising a rotary cam rotatably supported on said truck rearwardly of each said wheel, said cam having an external camming surface having the shape of an Archimedean spiral with inner and outer ends and having a flat, rearwardly facing chordal stop surface extending between said ends of said camming surface, and a weight carried by said cam adjacent said stop surface and adapted to dispose said stop surface perpendicularly to said load carrying platform, said stop surface having a height substantially equal to the height of the bottom of the pallet and a lower edge disposed in a horizontal plane slightly above the horizontal plane of the lower edge of said wheels, each said rotary cam being supported on said truck rearwardly of the associated rear wheels a distance substantially equal to the length of said camming surface.

2. In materials handling equipment having a load carrying platform with a rear wheel for transporting pallets and the like, which have bottoms adapted to rest on a traction surface, the improvement of a pallet entry device comprising a rotary cam rotatably supported on said platform rearwardly of said wheel and having an arcuate camming surface with inner and outer ends, a flat, rearwardly facing chordal stop surface extending between said ends of said camming surface and a weight carried by said cam adjacent said stop surface and adapted to dispose said stop surface perpendicularly to said load carrying platform, said rotary cam being spaced rearwardly of said wheel a distance substantially equal to the length of said camming surface and having a lowermost edge slightly above the lowermost edge of said wheel said stop surface being adapted to engage the edge of said pallet bottom to rotate said cam and said camming surface being adapted to roll, from the region of least radius to the region of greatest radius, on said pallet bottom, to lift said wheel onto said pallet bottom.

3. In materials handling equipment having a load carrying platform with a rear wheel for transporting pallets and the like, which have a bottom adapted to rest on a traction surface, the improvement of a pallet entry device comprising rotary cam means rotatably supported on said truck rearwardly of said wheel and having a spiral camming surface and a flat, rearwardly facing stop surface and means to dispose said stop surface perpendicularly to said load carrying platform said stop surface being adapted to engage the edge of said pallet bottom to rotate said cam and said camming surface being adapted to roll, from the region of least radius to the region of greatest radius, on said pallet bottom to lift said wheel onto said pallet bottom.

4. The pallet entry device according to claim 3 in which said rotary cam means has a lowermost portion which is in a plane slightly above the horizontal plane of the lowermost portion of said wheel.

5. The pallet entry device according to claim 3 in which the said rotary cam means is spaced rearwardly of said wheel a distance substantially equal to the length of said camming surface.

6. A pallet entry device for facilitating the entry of a wheeled load carrying platform of materials handling equipment onto the bottom of pallets and the like comprising a rotary cam adapted to be rotatably supported on said equipment for rotation through an arc substantially equal to 360° and having a curved camming surface with inner and outer ends of different radii and a flat, rearwardly facing chordal stop surface extending between said ends of said camming surface said stop surface being adapted to engage the edge of said pallet bottom to rotate said rotary cam and said camming surface being adapted to roll, from the region of least radius to the region of greatest radius, on said pallet bottom to lift said wheeled load carrying platform.

7. The pallet entry device according to claim 6 with a weight carried by said cam adjacent said stop surface.

8. The pallet entry device according to claim 6 in which said camming surface has a shape substantially that of an Archimedean spiral.

9. A pallet entry device for the pallet entering end of a pallet truck comprising a cam rotatably mounted on a transverse axis near said end and having a substantially spiral external bearing surface of progressively different radii disposed to engage the pallet floor in rolling contact and progressively space said axis from said floor as the truck enters the pallet.

10. A pallet entry device for the pallet entering end of a pallet truck comprising a cam rotatably mounted on a transverse axis near said end and having a substantially spiral external bearing surface of progressively different radii disposed to engage the upper horizontal surface of a pallet floor in rolling contact to progressively space said axis from said surface as the truck enters the pallet and rotation of said cam is induced, the difference between the greater and the lesser of said radii being approximately equal to the thickness of said pallet floor.

11. A pallet entry device for the entering ends of pallet truck forks comprising cams rotatably mounted on transverse axes near the ends of the forks and each having substantially spiral external bearing surfaces with portions of progressively different radii disposed to engage the upper horizontal surface of the pallet floor in rolling contact and progressively space said axes and said forks from said surface as the forks enter the pallet and rotation of said cams is induced.

References Cited in the file of this patent
UNITED STATES PATENTS

| | | |
|---|---|---|
| 2,201,373 | Miniconi | May 21, 1940 |
| 2,245,800 | McDonald | June 17, 1941 |
| 2,443,130 | Erickson | June 8, 1948 |
| 2,498,504 | Quayle | Feb. 21, 1950 |
| 2,615,677 | Quayle | Oct. 28, 1952 |